June 7, 1960 P. T. KAESTNER 2,939,363
OPTICAL SIGHTING DEVICE
Filed Oct. 20, 1955 6 Sheets-Sheet 1

INVENTOR:
Paul T. Kaestner
BY:
Michael S. Striker
agt.

June 7, 1960 P. T. KAESTNER 2,939,363
OPTICAL SIGHTING DEVICE
Filed Oct. 20, 1955 6 Sheets-Sheet 2

INVENTOR:
Paul T. Kaestner
BY:
Michael S. Striker
agt.

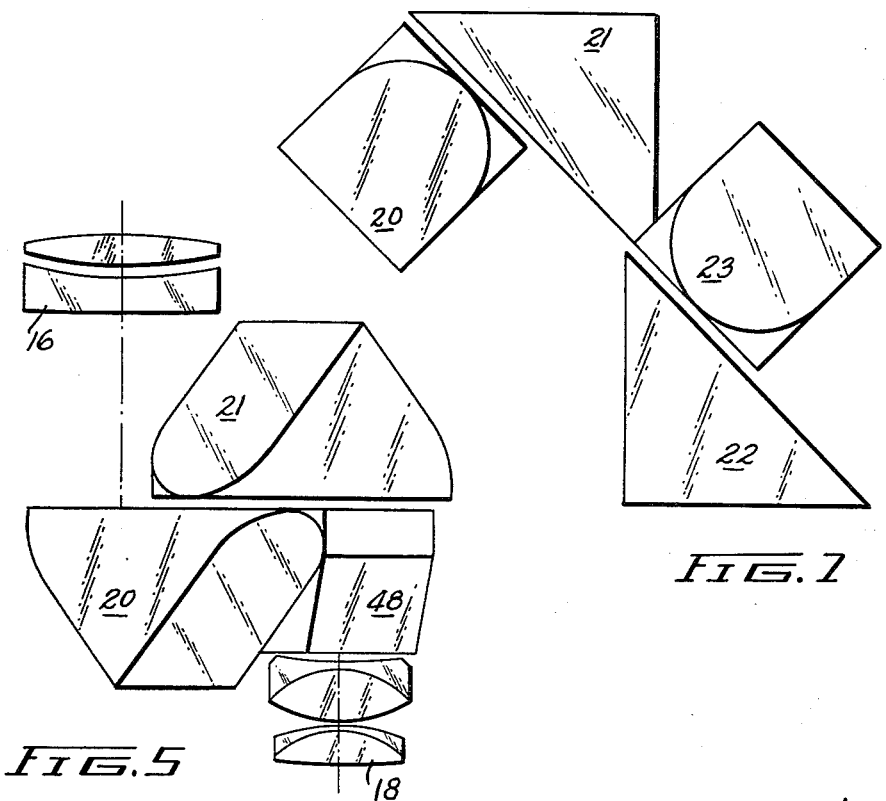
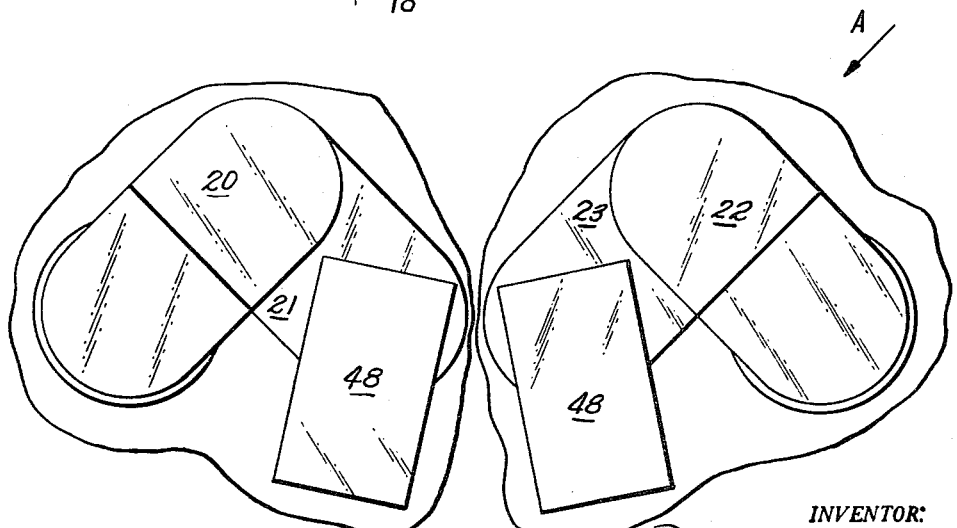

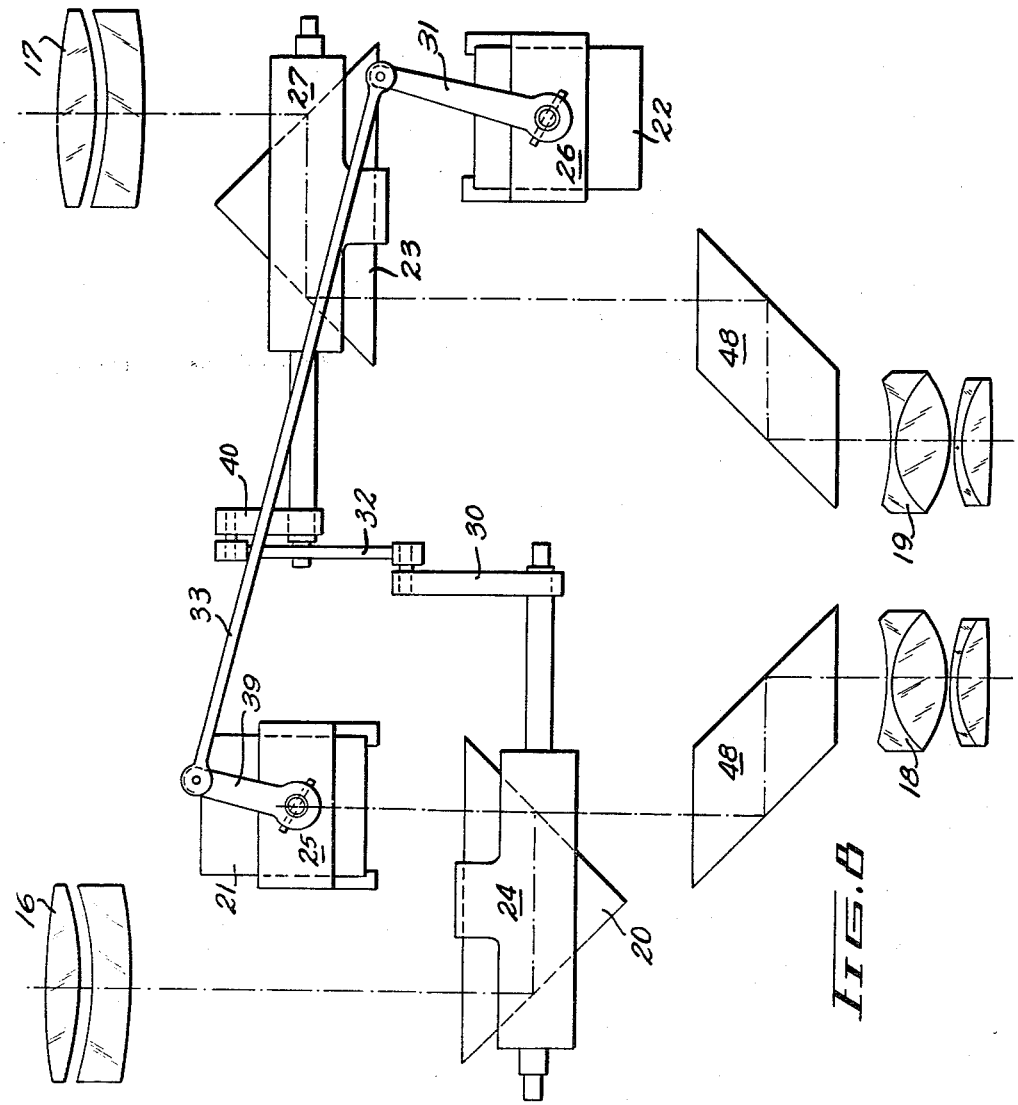

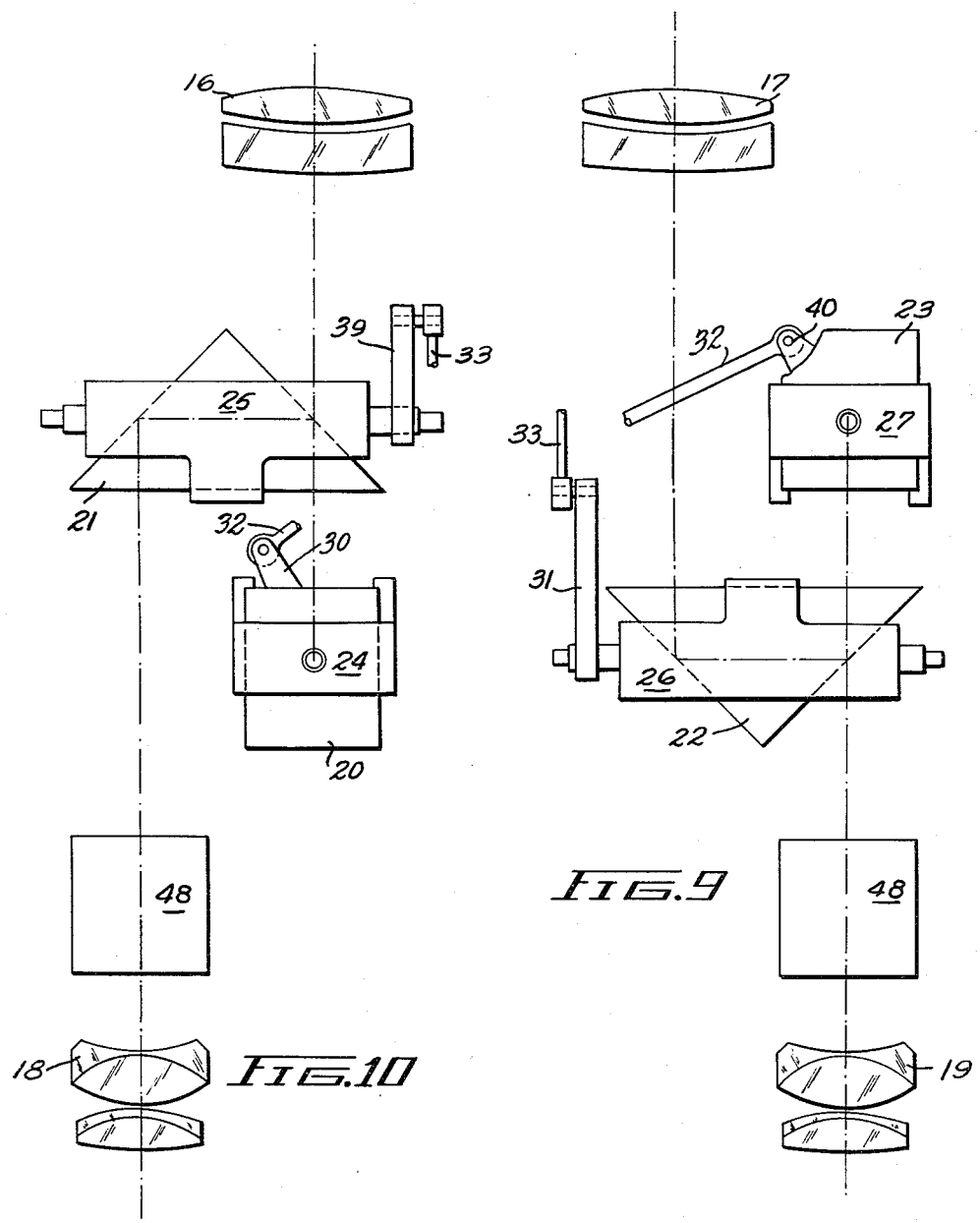

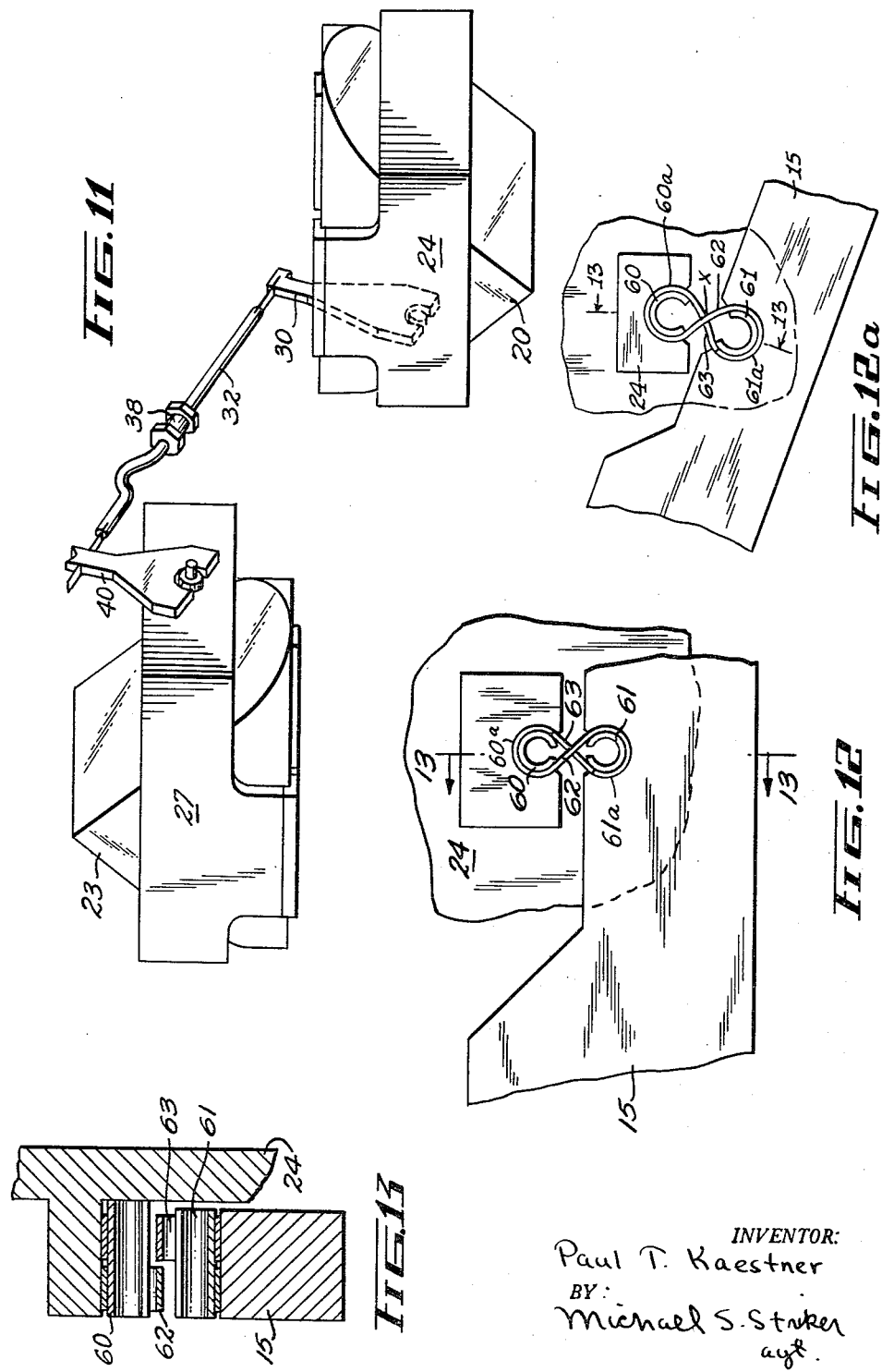

United States Patent Office 2,939,363
Patented June 7, 1960

2,939,363

OPTICAL SIGHTING DEVICE

Paul T. Kaestner, Pittsburgh, Pa., assignor to J. W. Fecker, Inc., Pittsburgh, Pa., a corporation of Pennsylvania Filed Oct. 20, 1955, Ser. No. 541,639

14 Claims. (Cl. 88—34)

The present invention relates to a sighting device such as a monocular or binocular, and more particularly to a stabilized monocular or binocular which enables the operator to see an image which does not participate in vibrations of the instrument.

Very often a sighting device such as a monocular or binocular is used on board ship or in an airplane or some other vehicle which is subject to vibrations, and it is very disturbing if the image viewed with the instrument participates in the vibrations of the vehicle. Although attempts have already been made to eliminate this disadvantage by attempting to provide a stabilized image, all conventional instruments for accomplishing this result are extremely complicated, are not optically correct, and only provide a partial solution to the problem.

One of the objects of the present invention is to provide an optical system which is capable of causing an image viewed through the system to appear to remain stationary when the system is subjected to angular shock or vibration movements.

Another object of the present invention is to provide image stabilization with a minimum variation in optical path lengths so as to assure a sharp image under all conditions.

A further object of the present invention is to provide an optical system capable of accomplishing the above objects and composed only of simple optical parts.

An additional object of the present invention is to provide an optical system which includes no gimbals or other similar devices for universally mounting prisms or the like.

Furthermore, it is an object of the present invention to provide a binocular system wherein each of the prisms of a group of prisms functions not only to direct an image between the objective and eye piece but in addition as a counterweight to another prism to which it is linked in accordance with the present invention.

Also, it is an object of the present invention to provide an arrangement capable of accomplishing all of the above objects and at the same time being composed of simple and ruggedly constructed elements which are very easy to assemble and disassemble and which are very reliable in operation.

With the above objects in view the present invention mainly consists of an optical sighting device which includes a frame and an objective and an eye piece carried by the frame. A light guiding means is located along the optical path between the objective and eye piece for directing to the latter an erect image of a subject sighted through the eye piece and objective. A means turnably connects the light guiding means to the frame for producing by means of the light guiding means an image which is compensated for sudden angular shifts and vibrations transmitted to the frame, said compensation being accomplished without significant changes in the focal distance between the eye piece and the objective.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a schematic top plan view of one-half of the binocular of the invention, Fig. 5 showing only the relationship between the lenses and prisms of the binocular of the invention;

Fig. 6 is a front view of the binocular also showing only the relationship between the optical element;

Fig. 7 is a view of the structure of Fig. 6 as viewed in the direction of arrow A of Fig. 6;

Fig. 8 is a diagrammatic plan view of the optical system showing in particular the interconnections between the prisms of the binocular of the invention;

Fig. 9 is a schematic illustration of the structure of Fig. 8 as seen from the right side thereof, parts of the structure of Fig. 9 being shown fragmentarily;

Fig. 10 is a partly fragmentary illustration of the structure of Fig. 8 as seen from the left side thereof;

Fig. 11 is an illustration of the interconnection between a pair of prisms, Fig. 11 showing the elements as seen in the direction of the arrow XI of Fig. 2 with the structure in addition to the interconnection between the prisms of Fig. 11 being eliminated for the sake of clarity;

Fig. 12 is a fragmentary partly sectional plan view of the manner in which the elements of the binocular of the invention are pivotally interconnected; and Fig. 12a is a fragmentary view similar to Fig. 12, showing the interconnected elements in angularly displaced relationship; and Fig. 13 is a fragmentary sectional view taken along line 13—13 of Figs. 12 and 12a in the direction of the arrows.

Figure 1:
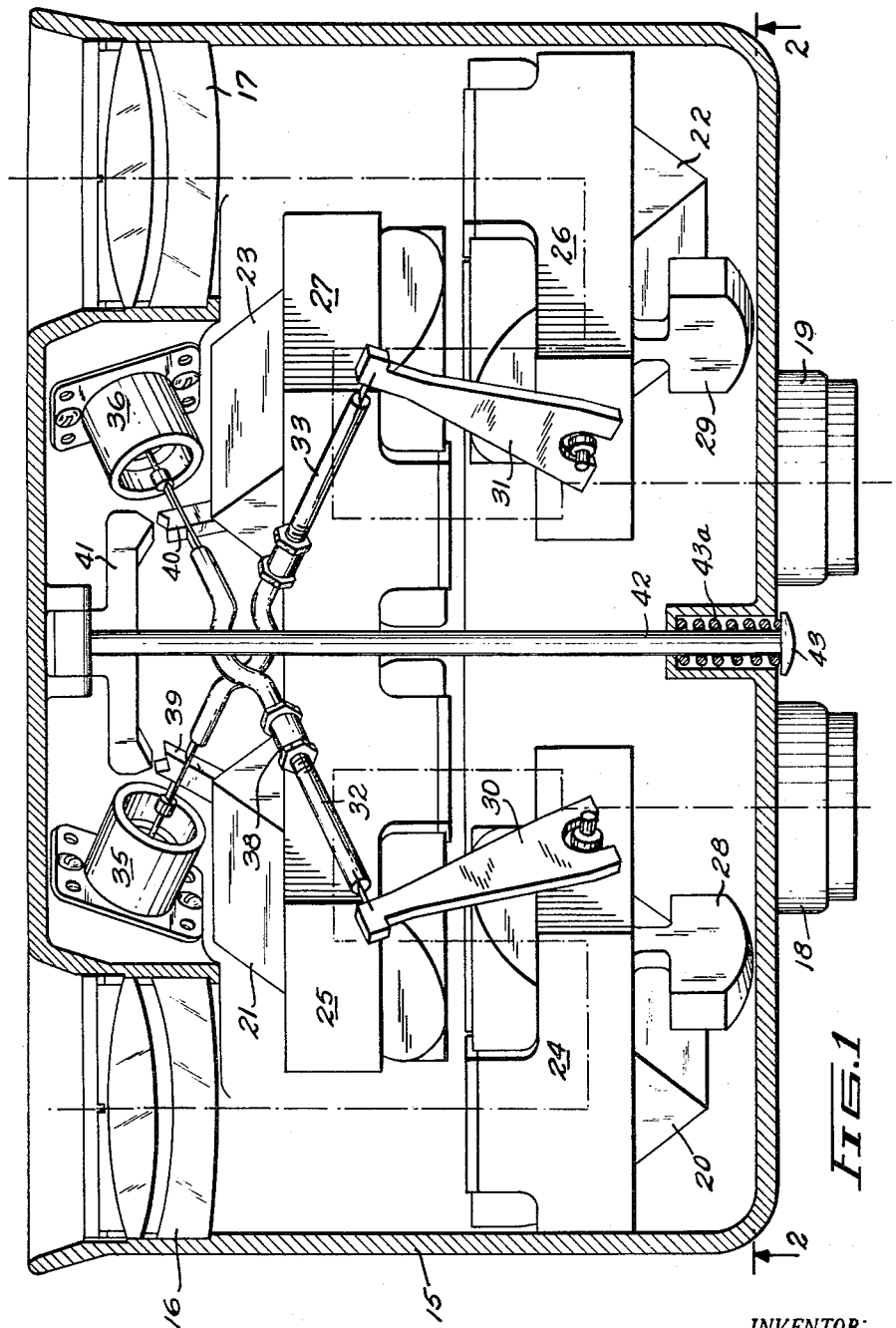
Fig. 1 is a top plan view of a binocular according to the present invention, the top wall of the housing of the binocular being removed in order to show the structure therebeneath.

Referring now to the drawings, it will be seen from Fig. 1 that the structure of the invention is supported by a frame in the form of a binocular housing 15. The frame 15 carries at its front end a pair of objectives 16 and 17, and the frame 15 carries at its rear end a pair of eye pieces 18 and 19, the objectives and eye pieces being of a purely conventional construction.

Along the optical path from the objective 16 to the eye piece 18 are located a pair of Porro prisms 20 and 21, and along the optical path between the objective 17 and the eye piece 19 are located a pair of Porro prisms 22 and 23. The prisms 20—23 are respectively carried by prism carriers 24—27, and these prism carriers may have counterweights connected thereto for a purpose described below. Thus, Fig. 1 shows the counterweights 28 and 29 connected respectively to the prism carriers 24 and 26. Each of the prisms is carried by the frame for turning movement about an axis which passes through the oppositely inclined faces of the prism and which is perpendicular to the intersection between these faces. The particular manner in which the prisms are pivotally mounted will be described below in connection with Figs. 12 and 13.

Figure 3:
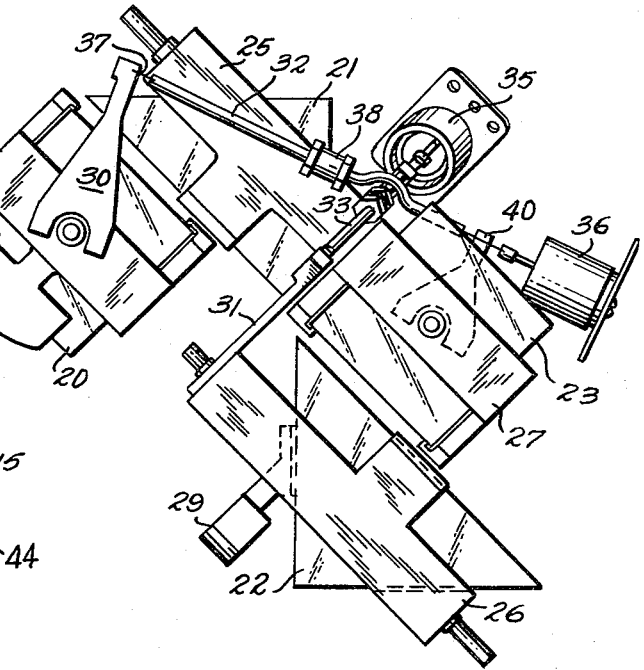
Fig. 3 is a view of the structure in the interior of the binocular with the outer frame or housing thereof removed, Fig. 3 showing the parts of Fig. 2 as seen in the direction of the arrow III of Fig. 2.

As is apparent from Fig. 1, the prism carriers 24 and 26 are fixed to a pair of crank arms 30 and 31, respectively, and these crank arms are in turn interconnected through connecting rods 32 and 33, respectively, with crank arms 40 and 39, respectively. As shown in Figs. 1 and 3, the pivot connections between the crank arms and connecting rods are composed of flexure strips although Figs. 8, 9, and 10 show them in schematic form as more conventional shaft and journal pivot connections. Provision for alignment of the images viewed with the left eye and with the right eye is provided by the connecting turnbuckles 38 which serve to adjust the length of connecting members 32 and 33. Crank arms 40 and 39 are connected in turn with pistons which slide in cylinders 36 and 35, respectively, these cylinders being fixed to the frame 15 in the manner shown in Fig. 1. The dashpot mechanisms use air as the damping medium, the cylinder ends being provided with adjustable openings to regulate the flow of air in and out of the cylinders. Figs. 1 and 3 illustrate the connection between crank arms 40 and 39 and the dashpot pistons as consisting of flexure strips. For simplicity, the dashpots are not shown on Figs. 8, 9, 10 and 11.

The crank arms 39 and 40 are provided at their free ends visible in Fig. 1 with V-shaped notches which cooperate with the pointed ends of a caging member 41. This caging member is guided by suitable guides of the frame 15 for shifting movement back and forth toward and away from the levers 39 and 40, and a rod 42 extends through the wall of frame 15 and has an enlarged end 43 acted on by spring 43a shown in Fig. 1. Caging spring 43a acts to engage caging member 41 with arms 39 and 40 to hold the stabilizing prisms at a centralized position and when it is desired to use the stabilization feature the rod 42 is pushed into the position indicated in Fig. 1 to permit the prisms to rotate on their pivot axes.

Figure 2:
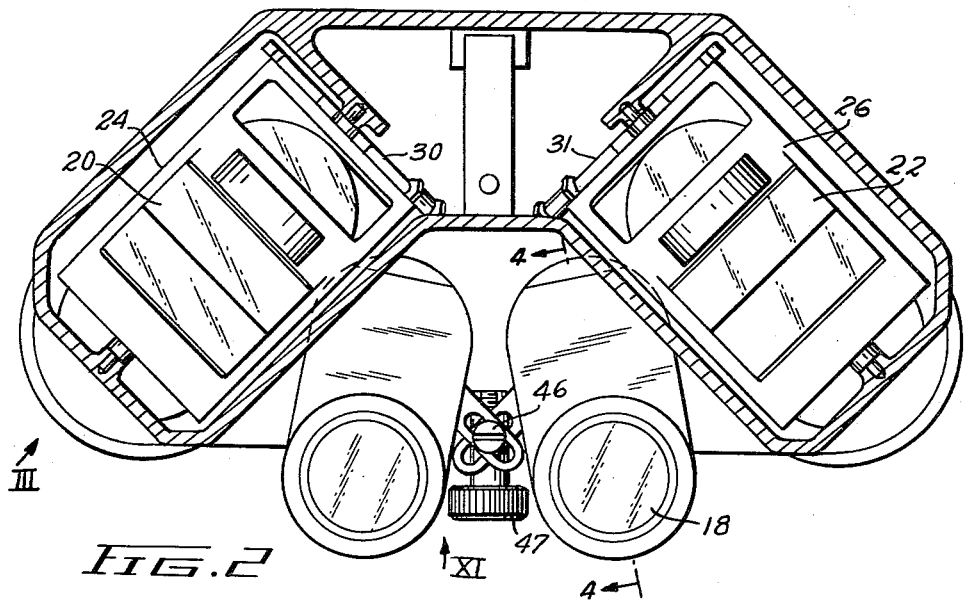
Fig. 2 is a sectional front view of the binocular of Fig. 1, Fig. 2 being taken along line 2—2 of Fig. 1 in the direction of the arrows.
Figure 4:
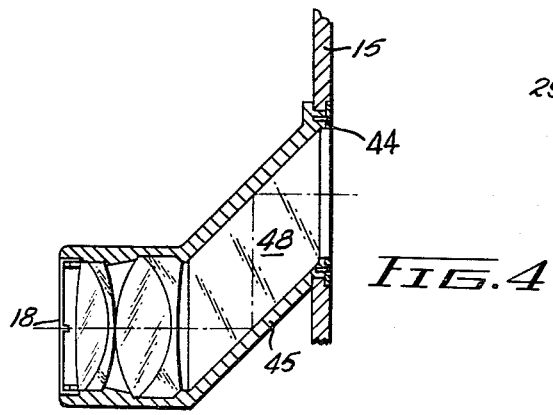
Fig. 4 is a fragmentary sectional elevational view of an eye piece of the binocular, Fig. 4 being taken along line 4—4 of Fig. 2 in the direction of the arrows.

The relationship between the prisms and the structure of the prism carriers are further apparent from Figs. 2 and 3. Thus, as is apparent from Fig. 2, the prisms 20 and 22 are inclined oppositely to each other, and the rods 32 and 33 also are inclined oppositely to each other. Furthermore, as is apparent from Fig. 2 as well as Fig. 4 the eye pieces 18 are located in tubular housings which are rotatably turnable on the frame 15. Thus, as is apparent from Fig. 4, the frame 15 is provided at each opening which accommodates an eye piece with a retainer 44 which extend into a circular recess of the frame 15 so that in this way the eye pieces are guided for turning movement. As is apparent from Fig. 2 the eye piece housings 45 have oppositely inclined lugs extending therefrom, passing one over the other, and provided with slots through which a screw member 46 passes, this screw member being carried by a sleeve through which freely extends a screw 47 having a knurled head end engaging one end of the sleeve, screw 47 extending threadedly into a suitably threaded opening of the casing 15. A collar or the like on screw 47 prevents axial shifting of the sleeve with respect to the screw. Thus, when the screw 47 is turned in or out the eye pieces 18 and 19 will be swung toward or away from each other, and in this way the binocular may have its interocular distance adjusted to accommodate the particular user. As is apparent from Fig. 4, each of the housings 45 is provided with a rhomboid prism 48 for directing the image from the Porro prisms to the eye piece 18.

Referring to Fig. 1, it will be seen that the light passing through the objective 16 first passes through the Porro prism 20, then through the Porro prism 21, and then through one of the rhomboids 48 to the eye piece 18, while on the other side of the binocular the light passing through the objective 17 passes first through the Porro prism 22, then through the Porro prism 23, and then through the other rhomboid prism 48 to the eye piece 19.

As is particularly apparent from Fig. 3, the axes of rotation of the Porro prisms 22 and 21 are parallel to each other, while the axes of rotation of the Porro prisms 20 and 23 are parallel to each other.

Fig. 5 showns in particular the inclination of the prisms 20 and 21 with respect to each other, and Fig. 5 also shows the relationship between these prisms and the objective 16 and eye piece 18, the rhomboid prism 48 associated with the left side of the binocular also being shown in Fig. 5. The right side of the binocular is symmetrical with the left side shown in Fig. 5. Fig. 6 further clearly illustrates the relationship between the prisms as viewed from the front of the binocular. Thus, as is apparent from Figs. 5 and 6 the turning axis of prism 20 is perpendicular to the turning axis of prism 21 and the turning axis of prism 22 is perpendicular to the turning axis of prism 23, the turning axes of prisms 21 and 22 being parallel to each other and the turning axes of prisms 20 and 23 being parallel to each other. Fig. 7 additionally shows clearly the above described relationships between the four Porro prisms used in the binocular of the present invention.

Figs. 8–10, and Fig. 8 in particular, show diagrammatically the manner in which the Porro prisms are interconnected for turning movement together in accordance with the present invention. In Figs. 8–10 the arrangement of the prisms is shown schematically for the sake of clarity, and furthermore in order to simplify the illustration of the principle of the invention the turning axes of the prisms 21 and 22 are shown as extending vertically while the turning axes of the prisms 20 and 23 are shown as extending horizontally. In accordance with the present invention the prisms 21 and 22 which turn about parallel axes, respectively, are interconnected for turning movement together, and the same is true of the prisms 20 and 23 which also turn about parallel axes, respectively. Crank 39 is fixed to the prism carrier 25 for turning movement with the prism 21, and crank 31 is fixed to the prism carrier 26 for turning movement with the prism 22, these cranks 39 and 31 being interconnected by a connecting rod 33. Thus, the prisms 21 and 22 are constrained to turn together, and since the crank arm 31 is longer than the crank arm 39, it is apparent that the prism 22 will be compelled to turn through a smaller angle than the prism 21. In the same way, crank 30 is fixed to the prism carrier 24 for turning movement with the prism 20 and a crank 40 is fixed to the prism carrier 27 for turning movement with the prism 23, the cranks 30 and 40 being interconnected by a connecting rod 32. Elements 30—32 are respectively identical with elements 31—33. Thus, as is apparent from Figs. 9 and 10, the crank arm 40 has a length which is smaller than the length of the crank arm 30, and it will be noted from Fig. 8 that the crank arm 39 is equal in length to the crank arm 30. The connecting rods 32 and 33 are also of equal length when turnbuckles 38 are in proper adjustment. Fig. 8 further illustrates diagrammatically the manner in which the images are guided through the objectives to the eye pieces.

It should be understood that in an optical system comprising a frame carrying an objective and an eye piece and an erecting system turnably supported in the frame and located with its turning axis not at the midway point of the optical path between objective and eye piece but nearer to the eye piece, whenever the objective and the eye piece are angularly displaced with respect to the erecting system maintained stationarily in space due to its inertia, the image will be under-corrected, i.e. a central ray through the objective in displaced position will not pass centrally through the correspondingly displaced eye piece but at a distance from the location of its nodal point before displacement which distance is greater than the displacement of the eye piece from that location.

However, if the erecting system is located with its turning axis nearer to the objective, under the same conditions the image will be overcorrected, i.e., a central ray through the objective in displaced position will not pass centrally through the correspondingly displaced eye piece, but will pass at a distance from the location of its nodal point before displacement which distance is smaller than the displacement of the eye piece from that location.

The amount of overcorrection and undercorrection is determined by the relative distances of the turning axis of the erecting system from the associated objective and eye piece along the optical path.

According to the invention, in the optical system of a monocular, or in each of the optical systems of a binocular, two erecting elements are used, as for instance, prisms 21 and 20, one being located along the optical path with its turning axis nearer to the eye piece and one nearer to the objective. Therefore, one of these elements will tend to undercorrect while the other one will tend to overcorrect.

It is to be noted that a prism like 20 is nearer to the objective 16 along the optical path while being located structurally nearer to the eye piece 18. The same applies analogously to the other prisms.

Since in the preferred embodiment of the invention the turning axes of two erecting elements 20, 21 are oriented perpendicularly to each other, each element will act differently depending upon in which plane the angular vibration occurs. If the angular vibration takes place in a plane which is perpendicular to the turning axis of one of the two erecting elements 20, 21 only this element will tend to overcorrect or under-correct, as the case may be, because it tends to stand still in space, while the other erecting element will participate in the angular movement of the frame. If the angular vibration occurs in a plane inclined to the axes of both erecting elements, then components of the angular vibration respectively perpendicular to the two axes will cause the relative movement of the particular erecting element with respect to the frame, resulting in corresponding under-correction and over-correction, respectively.

According to the invention such movements of the individual erecting elements are counteracted and compensated by associating with each erecting element or prism a compensating mass of equal inertia as the particular erecting element or prism, said compensating mass being mounted in the frame for pivotal movement about an axis parallel with the turning axis of the associated erecting element or prism, and by attaching to said mass and prism, respectively, levers which are connected by a link so that neither the prism nor the mass can turn in the frame without the other. The two connecting members, i.e. the compensating mass and the prism tend to stand still in place, but they both must turn with respect to the turning frame due to the relative movement of their respective axes with the frame during the vibratory movement. The two masses influence each other through their connections, namely the above-mentioned link and the levers. On account of the fact that the length of the levers attached to the prism and to the compensating mass, respectively, is different, the relative turning movement of the compensating mass is caused, in a predetermined manner, to be slower, and the turning movement of the prism is caused to be faster angularly than the movement of the frame. The ratio between the lengths of the cooperating levers is selected so as to be equal to the ratio between the undercorrection and overcorrection of the two associated erecting elements. The result of the mutual counteraction set up between each erecting element and its associated mass is the automatic adjustment of the particular erecting element, i.e., a rotation thereof relative to the frame to the extent that the otherwise inevitable overcorrection or undercorrection, as the case may be, is eliminated. In this manner, a disturbance or blurring of the image passing through the eye piece during angular vibrations is eliminated.

It should be noted that in the case of the binocular system shown in the drawings, each prism functions as the compensating means for another prism.

As is apparent from Fig. 8, the turning axes of the prisms 21 and 23 are at right angles to each other, although they could make some other different angle with each other. Also, the turning axes of the prisms 20 and 22 are at right angles to each other, although they could make a different angle with each other. The turning axes of prisms 21 and 23 are located equidistant from the nodal points of their respective objectives 16 and 17 and from the nodal points of their respective eyepieces 18 and 19. If it were possible to locate all of the turning axes of the four prisms in the plane which is midway between the nodal points of the objectives and eye pieces, it would be possible to provide optimum stabilization. However such an arrangement would require the use of a complex prism structure and the use of devices such as gimbal rings and the like. With the present invention simple Porro prisms are used and at the same time the Porro prisms are interconnected in such a way that they produce the same result as if their turning axes were all located in the plane which is midway between the nodal points of the objectives and eye pieces. With the arrangement shown in Fig. 8 the prisms 20 and 22 which are located nearer to the objectives tend to overcorrect the image, while the prisms 21 and 23 which are located nearer to the eye pieces tend to undercorrect the image. It will be noted that with the arrangement shown each prism which tends to overcorrect is interconected with a prism which tends to undercorrect, and furthermore the length of the crank arm connected to those prisms which tend to undercorrect are shorter than the crank arms connected to those prisms which tend to overcorrect. Thus, considering the left side of the binocular shown in Fig. 8, it will be apparent that the prism 23 acts as a counterweight to control together with the linkage 30—40 the turning movement of the prism 20, while the prism 21 acts as a counterweight to control through the linkage 31—39 the turning movement of the prism 22. In the same way the prisms 20 and 22 respectively act as counterweights on the prisms 23 and 21 through the linkages shown. The lengths of the crank arms are chosen in such a way that the prism 21 turns through a larger angular distance than the prism 22 by the same ratio as that between the over-correction of prism 22 and the undercorrection of the prism 21. In the same way the prisms 20 and 23 are interconnected so that the prism 23 turns through a larger angular distance than the prism 20 by the same ratio as that between the over-correction of prism 20 and the undercorrection of the prism 23. In this way collimation is maintained at all times to guarantee that there is no image doubling or eye strain resulting from the angular vibration of the system. Fig. 11 further illustrates the manner in which the prisms 20 and 23 are interconnected as they are actually positioned in the frame of the binocular of the invention.

When the above described binocular arrangement is used on a vehicle which makes rapid turns it is of course impossible for the optical system to follow, and for such purposes the caging mechanism described above in connection with Fig. 1 is used to rapidly centralize the optical system to its position of optimum centralization. When the caging mechanism is in the position shown in Fig. 1, the Porro prisms are free to turn, and any vibrations which are transmitted to the frame 15 cause the latter to move with respect to the Porro prisms so that the image does not vibrate. The turning of the Porro prisms is damped with the above described damping structure.

In order to illustrate the structure of the invention as simply as possible, only conventional pivots for the prisms have been shown in the above described figures. Actually, however, the several prisms of the invention are pivotally mounted with flexure bearings having the construction illustrated in Figs. 12, 12a and 13. In Figs. 12 and 13 only the structure for pivotally mounting one part of the prism carrier 24 which carries the prism 20 is shown. However it is to be understood that the identical structure is used for pivotally mounting all of the Porro prisms. Thus, according to Figs. 12 and 13 it will be seen that the frame 15 is pivotally connected with the prism carrier 24 by a pair of oppositely wound S-shaped flexure strips 62, 63 located alongside each other and held with their respective cylindrical ends in corresponding substantially cylindrical recesses 60a, 61a, respectively, provided in the mutually opposed edge surfaces of frame 15 and carrier 24, respectively. The ends of these strips 62, 63 are firmly held in their recesses by rollpins 60, 61, respectively, forced into the cylindrical end portions of the strips 62, 63, respectively. These flexure strips 62 and 63 are made of a springy metal or the like so that they enable the prisms to turn without friction, and at the same time the flexure strips serve to restore the prisms to their optimum centralized position after the prisms are turned from this position. The pivotal axis of the flexure bearings described above is defined by the intersection of the planes in which the two straight portions of the strips 62, 63 are located. Figs. 12 and 12a illustrate the bearing in normal and in rotated or flexed condition. Thus, the flexure bearings of the present invention serve not only to pivotally mount the several prisms, but in addition these flexure bearings serve to automatically restore the prisms to their centralized position in order to take care of relatively small movements of the prisms.

In the above described arrangement the rhomboid prisms 48 do not participate in the stabilizing action and act solely in order to provide a means for adjusting the interocular distance of the binocular.

It is apparent that the principle of the invention described above is applicable to a monocular as well as to a binocular. When applied to a monocular it is only necessary to use counterweights instead of the prisms on one side of the binocular described above.

With the above described structure of the invention the image will appear to remain stationary when the instrument is subjected to angular shock or vibration movements, and furthermore stabilization is accomplished with a minimum variation in optical path lengths in order to assure a sharp image under all conditions.

It will be understood that each of the elements described above, or two or more together, may also find a useful application in other types of sighting devices differing from the types described above.

While the invention has been illustrated and described as embodied in stabilized optical system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An optical sighting device comprising, in combination, a frame; at least one objective and at least one eye piece carried by said frame; pivotable image erecting means located in the optical path between said objective and said eye piece, said image erecting means including a first pivotable element and a second pivotable element spaced from each other along said optical path, said first element being located between said objective and the midway point of said optical path and therefore causing an overcorrection consisting in that a central ray through said objective in angularly displaced position relative to said erecting means passes through said eye piece correspondingly displaced at a point distant from its center and at a distance from the location of its nodal point before its displacement, said last mentioned distance being smaller than the displacement of said eye piece from said location, and said second element being located between said eye piece and the midway point of said optical path and therefore causing an undercorrection consisting in that a central ray through said objective in angularly displaced position relative to said erecting means passes through said eye piece correspondingly displaced at a point distant from its center and at a distance from the location of its nodal point before its displacement, said last mentioned distance being greater than the displacement of said eye piece from said location; first and second pivot means supporting said first and second elements, respectively, on said frame for turning movement about transverse axes; and first and second compensating means including first and second counterweight means, respectively, turnably mounted on said frame and first and second torque transmitting linkage means respectively connecting said counterweight means with said first and said second elements, respectively, for causing turning movements thereof during angular vibration of said frame through respectively selected angles for compensating the overcorrection of said first element and the undercorrection of said second element; and bias means interconnecting said frame with said first and second elements, respectively, for returning said elements from any turned position to their normal position in said frame.

2. An optical sighting device comprising, in combination, a frame; at least one objective and at least one eye piece carried by said frame; pivotable image erecting means located in the optical path between said objective and said eye piece, said image erecting means including a first pivotable element and a second pivotable element spaced from each other along said optical path, said first element being between said objective and the midway point of said optical path and therefore causing an overcorrection consisting in that a central ray through said objective in angularly displaced position relative to said erecting means passes through said eye piece correspondingly displaced at a point distant from its center and at a distance from the location of its nodal point before its displacement, said last mentioned distance being smaller than the displacement of said eye piece from said location, and said second element being located between said eye piece and the midway point of said optical path and causing an undercorrection consisting in that a central ray through said objective in angularly displaced position relative to said erecting means passes through said eye piece correspondingly displaced at a point distant from its center and at a distance from the location of its nodal point before its displacement, said last mentioned distance being greater than the displacement of said eye piece from said location; first pivot means supporting said first element on said frame for turning movement about a first axis; second pivot means supporting said second element on said frame for turning movement about a second axis transverse to said first axis; first compensating means including first counterweight means movably mounted on said frame for turning movement about a third axis parallel to said first axis; second compensating means including second counterweight means movably mounted on said frame for turning movement about a fourth axis parallel to said second axis; first torque transmitting linkage means connecting said first compensating means with said first element for causing turning movements thereof in unison through angular distances respectively differing from each other, the transmission ratio of said linkage being dimensioned so as to cause the ratio of said angular distances to be such that the overcorrection of said first element is compensated during angular vibration of said frame; second torque transmitting linkage means connecting said second compensating means with said second element for causing turning movements thereof in unison through angular distances respectively differing from each other, the transmission ratio of said linkage being dimensioned so as to cause the ratio of said angular distances to be such that the undercorrection of said second element is compensated during angular vibration of said frame; and bias means interconnecting said frame with said first and second elements, respectively, for returning said elements from any turned position to their normal position in said frame.

3. An optical sighting device comprising, in combination, a frame; at least one objective and at least one eye piece carried by said frame; pivotable image erecting means located in the optical path between said objective and said eye piece, said image erecting means including a first pivotable element and a second pivotable element spaced from each other along said optical path, said first element being located between said objective and the midway point of said optical path and therefore causing an overcorrection consisting in that a central ray through said objective in angularly displaced position relative to said erecting means passes through said eye piece correspondingly displaced at a point distant from its center and at a distance from the location of its nodal point before its displacement, said last mentioned distance being smaller than the displacement of said eye piece from said location, and said second element being located between said eye piece and the midway point of said optical path and therefore causing an undercorrection consisting in that a central ray through said objective in angularly displaced position relative to said erecting means passes through said eye piece correspondingly displaced at a point distant from its center and at a distance from the location of its nodal point before its displacement, said last mentioned distance being greater than the displacement of said eye piece from said location; first pivot means supporting said first element on said frame for turning movement about a first axis; second pivot means supporting said second element on said frame for causing turning movements thereof in unison about a second axis transverse to said first axis; first compensating means including first counterweight means movably mounted on said frame for turning movement about a third axis parallel to said first axis; second compensating means including second counterweight means movably mounted on said frame for turning movement about a fourth axis parallel to said second axis; first torque transmitting linkage means connecting said first compensating means with said first element for causing turning movements thereof in unison through different angular distances respectively differing from each other, the transmission ratio of said linkage being dimensioned so as to cause the ratio of said angular distances to be such that the overcorrection of said first element is compensated during angular vibration of said frame, said first linkage means including two arms of different length respectively secured to said first compensating means and to said first element, and a connecting rod pivotally connected at the ends thereof to said arms, respectively; and second torque transmitting linkage means connecting said second compensating means with said second element for causing turning movements thereof in unison through different angular distances respectively differing from each other, the transmission ratio of said linkage being dimensioned so as to cause the ratio of said angular distances to be such that the undercorrection of said second element is compensated during angular vibration of said frame, said second linkage means including two arms of different length respectively secured to said second compensating means and to said second element, and a connecting rod pivotally connected at the ends thereof to said last-mentioned arms, respectively; and bias means interconnecting said frame with said first and second elements, respectively, for returning said elements from any turned position to their normal position in said frame.

4. An optical sighting device comprising, in combination, a frame; at least one objective and at least one eye piece carried by said frame; pivotable image erecting means located in the optical path between said objective and said eye piece, said image erecting means including a first pivotable element and a second pivotable element spaced from each other along said optical path, said first element being located between said objective and the midway point of said optical path and therefore causing an overcorrection consisting in that a central ray through said objective in angularly displaced position relative to said erecting means passes through said eye piece correspondingly displaced at a point distant from its center and at a distance from the location of its nodal point before its displacement, said last mentioned distance being smaller than the displacement of said eye piece from said location, and said second element being located between said eye piece and the midway point of said optical path and therefore causing an undercorrection consisting in that a central ray through said objective in angularly displaced position relative to said erecting means passes through said eye piece correspondingly displaced at a point distant from its center and at a distance from the location of its nodal point before its displacement, said last mentioned distance being greater than the displacement of said eye piece from said location; first pivot means supporting said first element on said frame for turning movement about a first axis; second pivot means supporting said second element on said frame for causing turning movements thereof in unison about a second axis transverse to said first axis; first compensating means including first counterweight means movably mounted on said frame for turning movement about a third axis parallel to said first axis and having a mass substantially equal to the mass of said first element; second compensating means including second counterweight means movably mounted on said frame for turning movement about a fourth axis parallel to said second axis and having a mass substantially equal to the mass of said second element; first torque transmitting linkage means connecting said first compensating means with said first element for turning movement through angular distances respectively differing from each other, the transmission ratio of said linkage being dimensioned so as to cause the ratio of said angular distances to be such that the overcorrection of said first element is compensated during angular vibration of said frame; second torque transmitting linkage means connecting said second compensating means with said second element for causing turning movements thereof in unison through angular distances respectively differing from each other, the transmission ratio of said linkage being dimensioned so as to cause the ratio of said angular distances to be such that the undercorrection of said second element is compensated during angular vibration of said frame; and bias means interconnecting said frame with said first and second elements, respectively, for returning said elements from any turned position to their normal position in said frame.

5. An optical sighting device comprising, in combination, a frame; at least one objective and at least one eye piece carried by said frame; pivotable image erecting means located in the optical path between said objective and said eye piece, said image erecting means including a first pivotable element and a second pivotable element spaced from each other along said optical path, said first element being located between said objective and the midway point of said optical path and therefore causing an overcorrection consisting in that a central ray through said objective in angularly displaced position relative to said erecting means passes through said eye piece correspondingly displaced at a point distant from its center and at a distance from the location of its nodal point before its displacement, said last mentioned distance being smaller than the displacement of said eye piece from said location, and said second element being located between said eye piece and the midway point of said optical path and therefore causing an undercorrection consisting in that a central ray through said objective in angularly displaced position relative to said erecting means passes through said eye piece correspondingly displaced at a point distant from its center and at a distance from the location of its nodal point before its displacement, said last mentioned distance being greater than the displacement of said eye piece from said location; first pivot means supporting said first element on said frame for turning movement about a first axis; second pivot means supporting said second element on said frame for turning movement about a second axis transverse to said first axis; first compensating means including first counterweight means movably mounted on said frame for turning movement about a third axis parallel to said first axis and having a mass substantially equal to the mass of said first element; second compensating means including second counterweight means movably mounted on said frame for turning movement about a fourth axis parallel to said second axis and having a mass substantially equal to the mass of said second element; first torque transmitting linkage means connecting said first compensating means with said first element for causing turning movements thereof in unison through angular distances respectively differing from each other, the transmission ratio of said linkage being dimensioned so as to cause the ratio of said angular distances to be such that the overcorrection of said first element is compensated during angular vibration of said frame, said first linkage means including a shorter arm secured to said first compensatng means, a longer arm secured to said first element, and a connecting rod pivotally connected at the ends thereof to said arms, respectively; and second torque transmitting linkage means connecting said second compensating means with said second element for causing turning movements thereof in unison through angular distances respectively differing from each other, the transmission ratio of said linkage being dimensioned so as to cause the ratio of said angular distances to be such that the undercorrection of said second element is compensated during angular vibration of said frame; and bias means interconnecting said frame with said first and second elements, respectively, for returning said elements from any turned position to their normal position in said frame.

6. An optical sighting device comprising, in combination, a frame; at least one objective and at least one eye piece carried by said frame; pivotable image erecting means located in the optical path between said objective and said eye piece, said image erecting means including a first pivotable element and a second pivotable element spaced from each other along said optical path, said first element being located between said objective and the midway point of said optical path and therefore causing an overcorrection consisting in that a central ray through said objective in angularly displaced position relative to said erecting means passes through said eye piece correspondingly displaced at a point distant from its center and at a distance from the location of its nodal point before its displacement, said last mentioned distance being smaller than the displacement of said eye piece from said location, and said second element being located between said eye piece and the midway point of said optical path and therefore causing an undercorrection consisting in that a central ray through said objective in angularly displaced position relative to said erecting means passes through said eye piece correspondingly displaced at a point distant from its center and at a distance from the location of its nodal point before its displacement, said last mentioned distance being greater than the displacement of said eye piece from said location; first pivot means supporting said first element on said frame for turning movement about a first axis; second pivot means supporting said second element on said frame for turning movement about a second axis transverse to said first axis; first compensating means including first counterweight means movably mounted on said frame for turning movement about a third axis parallel to said first axis; second compensating means including second counterweight means movably mounted on said frame for turning movement about a fourth axis parallel to said second axis; first torque transmitting linkage means connecting said first compensating means with said first element for causing turning movements thereof in unison through angular distances respectively differing from each other, the transmission ratio of said linkage being dimensioned so as to cause the ratio of said angular distances to be such that the overcorrection of said first element is compensated during angular vibration of said frame, said first linkage means including two arms of different length respectively secured to said first compensating means and to said first element, and a connecting rod pivotally connected at the ends thereof to said arms, respectively; second torque transmitting linkage means connecting said second compensating means with said second element for causing turning movements thereof in unison through angular distances respectively differing from each other, the transmission ratio of said linkage being dimensioned so as to cause the ratio of said angular distances to be such that the undercorrection of said second element is compensated during angular vibration of said frame, said second linkage means including two arms of different length respectively secured to said second compensating means and to said second element, and a connecting rod pivotally connected at the ends thereof to said last-mentioned arms, respectively, the ratio of length between said two arms in each of said first and second linkage means being the same as the ratio between the overcorrection of said first element and the undercorrection of said second element; and bias means interconnecting said frame with said first and second elements, respectively, for returning said elements from any turned position to their normal position in said frame.

7. A binocular sighting device comprising, in combination, a frame; first and second objectives carried by said frame; first and second eye pieces carried by said frame and respectively associated with said first and second objectives; first pivotable image erecting means located in the optical path between said first objective and said first eye piece, said first image erecting means including a first pivotable element and a second pivotable element spaced from each other along said optical path, said first element being located between said objective and the midway point of said optical path and therefore causing an overcorrection consisting in that a central ray through said first objective in angularly displaced position relative to said first erecting means passes through said first eye piece correspondingly displaced at a point distant from its center and at a distance from the location of its nodal point before its displacement, said last mentioned distance being smaller than the displacement of said first eye piece from said location, and said second element being located between said eye piece and the midway point of said optical path and therefore causing an undercorrection consisting in that a central ray through said first objective in angularly displaced position relative to said first erecting means passes through said first eye piece correspondingly displaced at a point distant from its center and at a distance from the location of its nodal point before its displacement, said last mentioned distance being greater than the displacement of said first eye piece from said location; first pivot means supporting said first element on said frame for turning movement about a first axis; second pivot means supporting said second element on said frame for turning movement about a second axis transverse to said first axis;

second pivotable image erecting means located in the optical path between said second objective and said second eye piece, said second image erecting means including a third pivotable element and a fourth pivotable element spaced from each other along said last-mentioned optical path, said third element being located between said second eye piece and the midway point of said latter optical path and therefore causing an undercorrection consisting in that a central ray through said second objective in angularly displaced position relative to said second erecting means passes through said second eye piece correspondingly displaced at a point distant from its center and at a distance from the location of its nodal point before its displacement, said last mentioned distance being greater than the displacement of said second eye piece from said location and said fourth element being located between said second objective and the midway point of said latter optical path and therefore causing an overcorrection consisting in that a central ray through said second objective in angularly displaced position relative to said second erecting means passes through said second eye piece correspondingly displaced at a point distant from its center and at a distance from the location of its nodal point before its displacement, said last mentioned distance being smaller than the displacement of said second eye piece from said location; third pivot means supporting said third element on said frame for turning movement about a third axis parallel to said first axis; fourth pivot means supporting said fourth element on said frame for turning movement about a fourth axis parallel to said second axis, said first and said fourth axes being located equidistant from said first and said second objectives, repectively, and said second and third axes being located equidistant from said first and second eye pieces, respectively; first torque transmitting linkage means connecting said third element with said first element for causing turning movements thereof in unison through angular distances respectively differing from each other, the transmission ratio of said linkage being dimensioned so as to cause the ratio of said angular distances to be such that the overcorrection of said first element and the undercorrection of said third element are compensated during angular vibration of said frame; and second torque transmitting linkage means connecting said fourth element with said second element for causing turning movements thereof in unison through angular distances respectively differing from each other, the transmission ratio of said linkage being dimensioned so as to cause the ratio of said angular distances to be such that the undercorrection of said second element and the overcorrection of said fourth element are compensated during angular vibration of said frame; and bias means interconnecting said frame with said first, second, third and fourth elements, respectively, for returning said elements from any turned position to their normal position in said frame.

8. A binocular sighting device comprising, in combination, a frame; first and second objectives carried by said frame; first and second eye pieces carried by said frame and respectively associated with said first and second objectives; first pivotable image erecting means located in the optical path between said first objective and said first eye piece, said first image erecting means including a first pivotable element and a second pivotable element spaced from each other along said optical path, said first element being located between said objective and the midway point of said optical path and therefore causing an overcorrection consisting in that a central ray through said first objective in angularly displaced position relative to said first erecting means passes through said first eye piece correspondingly displaced at a point distant from its center and at a distance from the location of its nodal point before its displacement, said last mentioned distance being smaller than the displacement of said first eye piece from said location, and said second element being located between said eye piece and the midway point of said optical path and therefore causing an undercorrection consisting in that a central ray through said first objective in angularly displaced position relative to said first erecting means passes through said first eye piece correspondingly displaced at a point distant from its center and at a distance from the location of its nodal point before its displacement, said last mentioned distance being greater than the displacement of said first eye piece from said location; first pivot means supporting said first element on said frame for turning movement about a first axis; second pivot means supporting said second element on said frame for turning movement about a second axis transverse to said first axis; second pivotable image erecting means located in the optical path between said second objective and said second eye piece, said second image erecting means including a third pivotable element and a fourth pivotable element spaced from each other and the midway point of said last-mentioned optical path, said third element being located between said second eye piece along said latter optical path and therefore causing an undercorrection consisting in that a central ray through said second objective in angularly displaced position relative to said second erecting means passes through said second eye piece correspondingly displaced at a point distant from its center and at a distance from the location of its nodal point before its displacement, said last mentioned distance being greater than the displacement of said second eye piece from said location and said fourth element being located between said second objective and the midway point of said latter optical path and therefore causing an overcorrection consisting in that a central ray through said second objective in angularly displaced position relative to said second erecting means passes through said second eye piece correspondingly displaced at a point distant from its center and at a distance from the location of its nodal point before its displacement, said last mentioned distance being smaller than the displacement of said second eye piece from said location, said third element having a mass substantially equal to the mass of said first element, and said fourth element having a mass substantially equal to the mass of said second element; third pivot means supporting said third element on said frame for turning movement about a third axis parallel to said first axis; fourth pivot means supporting said fourth element on said frame for turning movement about a fourth axis parallel to said second axis, said first and said fourth axes being located equidistant from said first and said second objectives, respectively, and said second and third axes being located equidistant from said first and second eye pieces, respectively; first torque transmitting linkage means connecting said third element with said first element for causing turning movements thereof in unison through angular distances respectively differing from each other, the transmission ratio of said linkage being dimensioned so as to cause the ratio of said angular distances to be such that the overcorrection of said first element and the undercorrection of said third element are compensated during angular vibration of said frame; second torque transmitting linkage means connecting said fourth element with said second element for causing turning movements thereof in unison through angular distances, respectively differing from each other, the transmission ratio of said linkage being dimensioned so as to cause the ratio of said angular distances to be such that the undercorrection of said second element and the overcorrection of said fourth element are compensated during angular vibration of said frame; and bias means interconnecting said frame with said first, second, third and fourth elements, respectively, for returning said elements from any turned position to their normal position in said frame.

9. A binocular sighting device comprising, in combination, a frame; first and second objectives carried by said frame; first and second eye pieces carried by said frame and respectively associated with said first and second objectives; first pivotable image erecting means located in the optical path between said first objective and said first eye piece, said first erecting means including a first pivotable element and a second pivotable element spaced from each other along said optical path, said first element being located between said objective and the midway point of said optical path and therefore causing an overcorrection consisting in that a central ray through said first objective in angularly displaced position relative to said first erecting means passes through said first eye piece correspondingly displaced at a point distant from its center and at a distance from the location of its nodal point before its displacement, said last mentioned distance being smaller than the displacement of said first eye piece from said location, and said second element being located between said eye piece and the midway point of said optical path and therefore causing an undercorrection consisting in that a central ray through said first objective in angularly displaced position relative to said first erecting means passes through said first eye piece correspondingly displaced at a point distant from its center and at a distance from the location of its nodal point before its displacement, said last mentioned distance being greater than the displacement of said first eye piece from said location; first pivot means supporting said first element on said frame for turning movement about a first axis; second pivot means supporting said second element on said frame for turning movement about a second axis transverse to said first axis; second pivotable image erecting means located in the optical path between said second objective and said second eye piece, said second image erecting means including a third pivotable element and a fourth pivotable element spaced from each other along said last-mentioned optical path, said third element being located between said second eye piece and the midway point of said latter optical path and therefore causing an undercorrection consisting in that a central ray through said second objective in angularly displaced position relative to said second erecting means passes through said second eye piece correspondingly displaced at a point distant from its center and at a distance from the location of its nodal point before its displacement, said last mentioned distance being greater than the displacement of said second eye piece from said location and said fourth element being located between said second objective and the midway point of said latter optical path and therefore causing an overcorrection consisting in that a central ray through said second objective in angularly displaced position relative to said second erecting means passeth through said second eye piece correspondingly displaced at a point distant from its center and at a distance from the location of its nodal point before its displacement, said last mentioned distance being smaller than the displacement of said second eye piece from said location, said third element having a mass substantially equal to the mass of said first element, and said fourth element having a mass substantially equal to the mass of said second element; third pivot means supporting said third element on said frame for turning movement about a third axis parallel to said first axis; fourth pivot means supporting said fourth element on said frame for turning movement about a fourth axis, said first and said fourth axes being located equidistant from said first and said second objectives, respectively, and said second and third axes being located equidistant from said first and second eye pieces, respectively parallel to said second axis; first torque transmitting linkage means connecting said third element with said first element for causing turning movements thereof in unison through angular distances respectively differing from each other, the transmission ratio of said linkage being dimensioned so as to cause the ratio of said angular distances to be such that the overcorrection of said first element and the undercorrection of said third element are compensated during angular vibration of said frame, said first linkage means including a shorter arm secured to said third element, a longer arm secured to said first element, and a connecting rod pivotally connected at the ends thereof to said arms, respectively; and second torque transmitting linkage means connecting said fourth element with said second element for causing turning movements thereof in unison through angular distances respectively differing from each other, the transmission ratio of said linkage being dimensioned so as to cause the ratio of said angular distances to be such that the undercorrection of said second element and the overcorrection of said fourth element are compensated during angular vibration of said frame, said second linkage means including a longer arm secured to said fourth element, a shorter arm secured to said second element, and a connecting rod pivotally connected at the ends thereof to said last-mentioned arms; and bias means interconnecting said frame with said first, second, third and fourth elements, respectively, for returning said elements from any turned position to their normal position in said frame.

10. A binocular sighting device, comprising, in combination, a frame; first and second objectives carried by said frame; first and second eye pieces carried by said frame and respectively associated with said first and second objectives; first pivotable image erecting means located in the optical path between said first objective and said first eye piece, said first erecting means including a first pivotable element and a second pivotable element spaced from each other along said optical path, said first element being located between said objective and the midpoint of said optical path and therefore causing an overcorrection consisting in that a central ray through said first objective in angularly displaced position relative to said first erecting means passes through said first eye piece correspondingly displaced at a point distant from its center and at a distance from the location of its nodal point before its displacement, said last mentioned distance being smaller than the displacement of said first eye piece from said location, and said second element being located between said eye piece and the midpoint of said optical path and therefore causing an undercorrection consisting in that a central ray through said first objective in angularly displaced position relative to said first erecting means passes through said first eye piece correspondingly displaced at a point distant from its center and at a distance from the location of its nodal point before its displacement, said last mentioned distance being greater than the displacement of said first eye piece from said location; first pivot means supporting said first element on said frame for turning movement about a first axis; second pivot means supporting said second element on said frame for turning movement about a second axis transverse to said first axis; second pivotable image erecting means located in the optical path between said second objective and said second eye piece, said second image erecting means including a third pivotable element and a fourth pivotable element spaced from each other along said last-mentioned optical path, said third element being located between said second eye piece and the midpoint of said optical path and therefore causing an undercorrection consisting in that a central ray through said second objective in angularly displaced position relative to said second erecting means passes through said second eye piece correspondingly displaced at a point distant from its center and at a distance from the location of its nodal point before its displacement, said last mentioned distance being greater than the displacement of said second eye piece from said location and said fourth element being located between said second objective and the midpoint of said optical path and therefore causing an overcorrection consisting in that a central ray through said second objective in angularly displaced position relative to said second erecting means passes through said second eye piece correspondingly displaced at a point distant from its center and at a distance from the location of its nodal point before its displacement, said last mentioned distance being smaller than the displacement of said second eye piece from said location, said third element having a mass substantially equal to the mass of said first element, and said fourth element having a mass substantially equal to the mass of said second element; third pivot means supporting said third element on said frame for turning movement about a third axis parallel to said first axis; fourth pivot means supporting said fourth element on said frame for turning movement about a fourth axis parallel to said second axis, said first and said fourth axes being located equidistant from said first and said second objectives, respectively, and said second and third axes being located equidistant from said first and second eye pieces, respectively; first torque transmitting linkage means connecting said third element with said first element for causing turning movements thereof in unison through angular distances respectively differing from each other, the transmission ratio of said linkage being dimensioned so as to cause the ratio of said angular distances to be such that the overcorrection of said first element and the undercorrection of said third element are compensated during angular vibration of said frame, said first linkage means including a shorter arm secured to said third element, a longer arm secured to said first element, and a connecting rod pivotally connected at the ends thereof to said arms, respectively; and second torque transmitting linkage means connecting said fourth element with said second element for causing turning movements thereof in unison through angular distances respectively differing from each other, the transmission ratio of said linkage being dimensioned so as to cause the ratio of said angular distances to be such that the undercorrection of said second element and the overcorrection of said fourth element are compensated during angular vibration of said frame, said second linkage means including a longer arm secured to said fourth element, a shorter arm secured to said second element, and a connecting rod pivotally connected at the ends thereof to said last-mentioned arms, the ratio of length between said two arms in said first linkage means being the same as the ratio between the overcorrection of said first element and the undercorrection of said third element, and the ratio of length between said two arms in said second linkage means being the same as the ratio between the overcorrection of said second element and the undercorrection of said fourth element; and bias means interconnecting said frame with said first, second, third and fourth elements, respectively, for returning said elements from any turned position to their normal position in said frame.

11. A binocular sighting device as set forth in claim 9 wherein said shorter arms have the same length, said longer arms have the same length, and said connecting rods have the same length, respectively.

12. A binocular sighting device as set forth in claim 9 and including a damping means operatively connected to said first and second linkage means respectively for damping the turning movement of the respective elements.

13. A binocular sighting device as set forth in claim 7 wherein each pivot means of said first, second, third and fourth pivot means is a flexure bearing means tending to restore the respective associated element to a rest position.

14. A binocular sighting device as set forth in claim 7 and including means for arresting said linkage means in a position in which said elements of said first and second image erecting means are in selected angular positions whereby said elements of said first and second image arresting means are arrested in said selected angular positions.

References Cited in the file of this patent

UNITED STATES PATENTS

| | | |
|---|---|---|
| 1,628,776 | Henderson | May 17, 1927 |
| 2,518,632 | O'Brien et al. | Aug. 15, 1950 |

FOREIGN PATENTS

| | | |
|---|---|---|
| 893,782 | France | Feb. 28, 1944 |